J. H. WILSON.
ELECTRIC LIGHTING SYSTEM FOR AUTOMOBILES.
APPLICATION FILED FEB. 13, 1918.

1,297,768.

Patented Mar. 18, 1919.
2 SHEETS—SHEET 1.

WITNESSES

INVENTOR
John H. Wilson
BY
ATTORNEYS

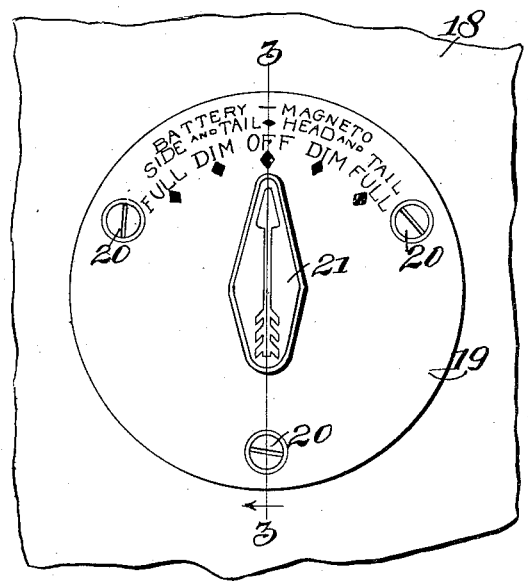
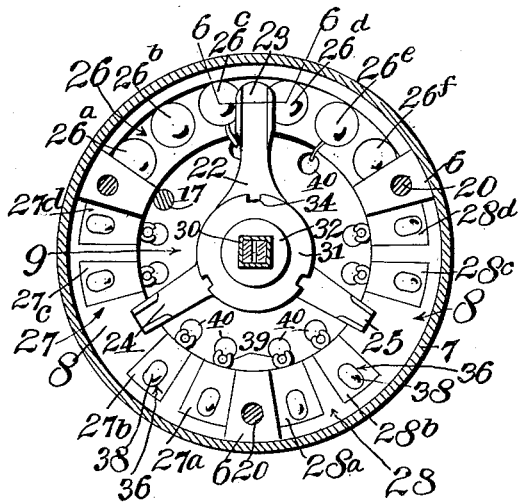
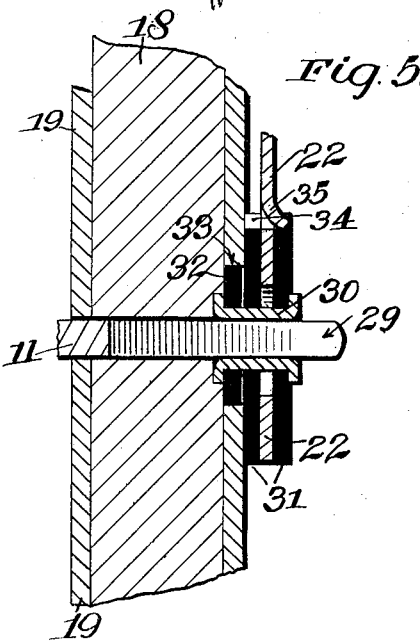

UNITED STATES PATENT OFFICE.

JOHN HART WILSON, OF THE UNITED STATES ARMY.

ELECTRIC-LIGHTING SYSTEM FOR AUTOMOBILES.

1,297,768.      Specification of Letters Patent.      Patented Mar. 18, 1919.

Application filed February 13, 1918. Serial No. 216,882.

*To all whom it may concern:*

Be it known that I, JOHN H. WILSON, a citizen of the United States, and an officer in the United States National Army, have made certain new and useful Improvements in Electric-Lighting Systems for Automobiles, of which the following is a specification.

My invention relates to an improved electric lighting system for automobiles, and aims to provide a novel and improved controller or switch and electrical connections with the electric headlights, side lights, dash light, tail light, magneto or electric generator, and battery, whereby the switch in being moved in one direction will light one set of lights from the magneto without taking current from the battery, and on being moved in another direction will light another set of lights from the battery, a common tail light being used with both sets of lights though the current furnished from the two sources is dissimilar; and provision being made to dim either set of lights by means of an interposed resistance, and to provide a position where all lights are off. The invention consists in the combinations, constructions, and arrangements herein described and claimed.

An object of my invention is to provide an electrical distribution system primarily for automobiles, which includes alternate sources of current, e. g. a generator or a battery, for supplying current to certain of the lamps in the system whether the engine is running or not, the distribution of the current being controlled by a master switch which is also one of the important features of the invention.

Another object of the invention is to provide an electrical distribution system for an automobile, which includes means whereby the existing headlights and the supplementary tail light together with such other lights as may be desired, may be operated from the magneto when the engine is running, and also that the same tail light in addition to the other lights, may be operated from a battery or other similar source of current supply when the engine is not running.

Another object of the invention is to provide an electrical distribution system as described, including a master switch having means whereby the side and tail lights when operated from the battery, may be dimmed in order to conserve the current.

Other objects and advantages will appear in the following specification, reference being had to the accompanying drawings in which—

Fig. 2 is an elevation of the dial plate of the master switch as it appears on the dash.

Fig. 3 is a vertical section on the line 3—3 of Fig. 2.

Fig. 4 is a vertical cross section on the line 4—4 of Fig. 3.

Fig. 5 is a detail sectional view showing the mounting of the contact piece on the key stem.

Figures 1, 6, 7:
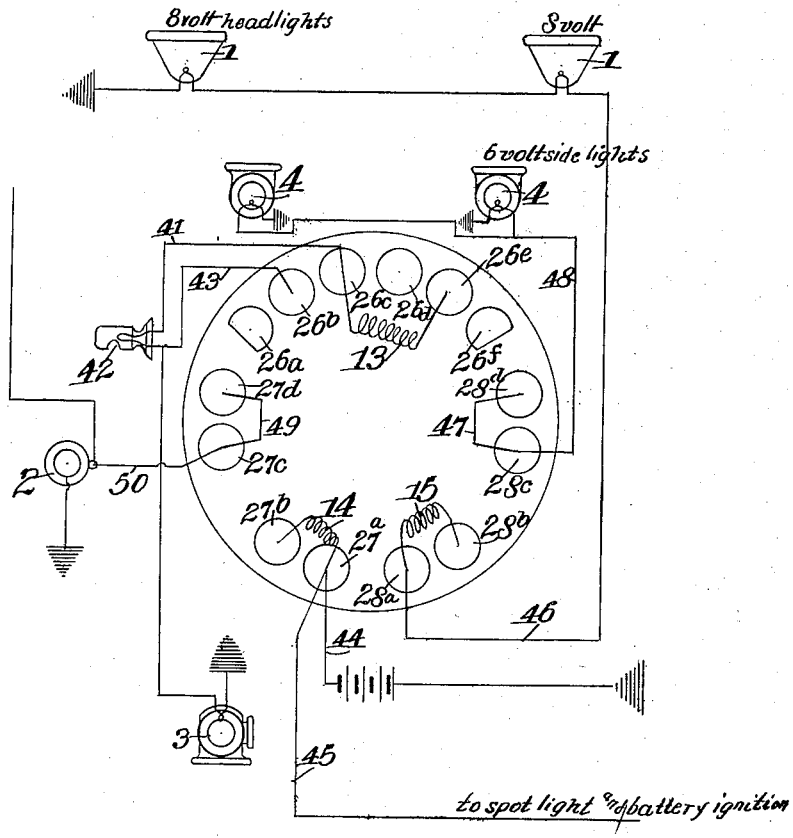
Figure 1 is a diagrammatic view of the electrical distribution system including the master switch.
Fig. 6 is a detail cross section on the line 6—6 of Fig. 4.
Fig. 7 is a detail perspective view of one of the contact plates.

Before proceeding with the description of the master switch, the electrical distribution system together with the manner of connection of the various lights on the automobile, will first be described in order that the relationship of the master switch may be more clearly understood.

The automobile which in the present instance is of a well known type, has the usual headlights 1. Each headlight has an eight-volt lamp thus requiring current at sixteen volts which is furnished from a 16-volt magneto 2 when the engine is running. A tail light 3 is mounted on the back of the car and is commonly lighted by an oil lamp. In the electrical distribution system here contemplated, the oil lamp is supplemented by a 6-volt electric lamp which is connected in the system so that it too is lighted from the magneto when the headlights are burning.

A pair of side lights 4 are arranged to be lighted from a 6-volt battery when the engine is not running, the tail light 3 also being so connected in the system that it is lighted with the side lights on the battery current, the changing from one source of current to the other being controlled by the master switch now to be explained.

Considering now more particularly Figs. 3 and 4, it will be observed that the master switch includes a porcelain or other insulating material base 5 which has a plurality of lugs 6 on the rear surface, to space the cover or shell 7 from the contact members inside of the master switch. An annular shelf 8 upon which the contact members are mounted, surrounds a shallow depression 9, and this depression in turn has a central recess 10 which the end of a key stem 11 occupies under certain conditions.

Formed on the front surface of the base 5 is an annular groove 12. The annular groove forms a central circular boss upon which a plurality of resistance wire coils 13, 14 and 15 are supported, and insulated from one another by mica or other insulating strips. Incidentally, instead of these resistance wires being in the nature of the coils encircling the central boss, they may simply consist of the helices as illustrated in Fig. 1. In both cases the function of the resistance wires is the same.

Cement 16 or other ceiling substance is packed into the annular groove 12 so as to exclude moisture and other foreign substances from the resistance wires. The shell 7 and base 5 are held together so as to form a unit, by a screw 17 which is turned in from the front as shown in Fig. 3.

Mounted on the exposed portion of the dash 18, i. e. that portion next to the driver, is a dial plate 19 which is secured in place on the dash and to the master switch by means of screws 20 which pass completely through. These screws are really in the nature of bolts which have nuts threaded on the ends, the nuts occupying suitable recesses in the front surface of the base 5.

Referring to Fig. 2, it will be observed that the dial plate 19 bears certain legends which indicate to the driver the direction in which the key 21 is to be turned. An arrow embossed on the key normally points to "off" when the master switch is in the normal or "0" position. The legends on the right indicate the various degrees of brilliancy capable of being obtained from the head light 1 by current from the magneto 2 when the engine is running. Similarly the legends at the left indicate the various degrees of brilliancy obtainable from the side and tail lamps 4 and 3 combined, by means of battery current when the engine is not running.

Considering now the construction of the master switch whereby the controlling of the electrical distribution system is performed, it will be observed that the stem 11 which is fixed in the key 21 carries on the front end a tridentate contact piece 22 which includes the three contact fingers 23, 24 and 25. The contact fingers possess sufficient degrees of resiliency to insure a perfect engagement between them and the various contacts in the master switch, when the key 21 is turned to the different positions indicated by the legends on the dial plate.

These contacts are arranged in three sets and are fixed upon the annular shelf 8. The upper set consists of contact studs 26 which are purposely made with rounded heads so that when the contact finger 23 which coöperates with this set of contacts, will firmly remain in position when sprung between any pair of the studs. Any position of the contact piece 22 may be known to the driver through the sound that the finger 23 makes in springing from one pair of contacts to the other. It is not necessary for the driver to inspect the dial when desiring to change from one indication to the other, since constant practice in operating the master switch will soon teach him just how far to turn the key 21 in either direction to obtain the desired result in lighting the sets of lamps from one current source or the other.

The set of contacts 26 includes the individual studs $26^a$, $26^b$, $26^c$, $26^d$, $26^e$ and $26^f$. The second set of contacts 27 at the left includes the individual contact plates $27^a$, $27^b$, $27^c$ and $27^d$, while the third set of contacts 28 at the right includes the plates $28^a$, $28^b$, $28^c$ and $28^d$. There is a space between the contact plates $27^b$ and $27^c$ at the left and the plates $28^b$ and $28^c$ at the right, large enough to accommodate the contact fingers 24 and 25 on the shelf 8 without engaging any of the contact plates when the contact piece 22 is in the initial position.

A slit 29 is formed on the front end of the stem 11 so as to give the stem enough resiliency to maintain the relationship of the contact piece on the stem without the aid of pins or other securing devices. The slitted end of the stem passes through a square bushing 30. The stem 11 is of course, also square thus permitting longitudinal movement of the stem with respect to the contact piece 22 and still preventing relative turning. The contact piece is clamped into position between insulating washers 31. A centering washer 32 also of insulating material, works in a circular opening 33 in the shell 7 and always keeps the contact piece in a central position.

The various insulating washers are all firmly fixed upon the square bushing 30 as plainly shown in Fig. 5, wherein it will also be observed that the ends of the bushing are simply expanded in the manner of a common hollow rivet to bind the respective washers and the contact piece firmly together. Notches 34 are formed at three places on the periphery of each washer 31. A lug 35 pressed forwardly from each contact finger, engages in the adjacent notch on the inside washer. The notches on the outside washer, i. e. the one next to the centering washer 32, have no function. Their presence in the drawings simply indicates that both washers are made alike, it being unnecessary to involve the making of separate washers for the front and back. Obviously the lugs 35 must be turned forwardly so as to prevent short circuiting between the contact piece and the shell 7.

For the same reason a relatively large central opening is formed in the contact piece so that there is no possibility of a short circuit between said piece and the bushing 30. It has been explained that the contact finger 23 springs over the rounded contact studs 26 and automatically maintains the adjustments of the contact piece. The same is not true of the fingers 24 and 25. These simply slide over the respective contact plates 27 and 28 without interference because these contact plates are set in recesses in the shelf 8, and the exposed top surfaces come flush with the surface of the shelf. Here it should also be observed that the lugs 6 perform the additional function of limiting the movement of the contact fingers and thus become stops.

The construction of the contact plates 27 and 28 may be varied, but the preferred construction is shown in Figs. 4 and 7. Here it will be seen that each plate has an oval depression 36 with a central opening 37. The oval head of a bolt 38 occupies the depression 36 while the shank passes through the opening 37 and a corresponding hole in the base 5, binding nuts being screwed on the ends of all of the bolts to hold the plates in position.

Clips 39 are formed on the inner end of each contact plate, the clips being formed on the portion of each contact plate which is bent at right angles and occupy the shallow depression 9. Normally the clips are straight as shown in Fig. 7, but these clips are adapted to be pinched or clamped around the ends of the resistance wires which project through suitably arranged holes 40 disposed adjacent to the contact plates and communicating with the annular groove 12 where the resistance wire coils are located.

The operation of the master switch is as follows, but before proceeding with the description of the operation it is thought desirable to explain the connections between the various contact studs and plates with the various lamps. Referring then to Fig. 1, it will be seen that the first resistance coil 13 is connected between the studs 26$^c$ and 26$^e$. The studs 26$^a$, 26$^d$ and 26$^f$ are blank.

A wire 41 leads from the contact 26$^e$ to the tail light 3 and has a 6-volt dash light 42 connected in series therewith. A branch 43 of this wire connects to the contact stud 26$^b$. The second resistance 14 is connected between the contact plates 27$^a$ and 27$^b$, a wire 44 leading from the plate 27$^a$ to the battery which in turn is grounded. A second wire 45 leads from the contact 27$^a$ and is adapted to be connected to the ordinary spot light usually carried by an automobile, so that should the engine fail at night the spot light may be lighted from the battery and enable the hunting of the engine trouble.

The third resistance 15 is connected between the contact plates 28$^a$ and 28$^b$, a wire 46 leading from the contact 28$^a$ to the headlights 1, the end of the wire being grounded. The companion contacts 28$^c$ and 28$^d$ are short circuited at 47, a wire 48 leading from the contact 28$^c$ to the side lights 4. The opposite contact plates 27$^c$ and 27$^d$ are short circuited at 49, a wire 50 leading from the contact 27$^c$ to the magneto 2.

Now having the connections in mind, the manner of operation may be proceeded with. Normally the contact piece occupies the position shown in Fig. 4 wherein the finger 23 rests between the contact 26$^c$ and the blank contact 26$^d$, while the remaining fingers rest on insulated portions between the contact sets 27 and 28. If the engine be running and brightly illuminated head and tail lights 1 and 3 are desired, the key 21 is turned to the extremity at the right whereupon the finger 23 will snap between the contacts 26$^e$ and 26$^f$ while the fingers 24 and 25 will rest upon the contact plates 27$^d$ and 28$^a$ respectively.

Current now flows from the magneto 2 over the wires 50 and 49 to contact plate 27$^d$, through the finger 24 of the contact piece, out at the contact stud 26$^e$, through the first resistance 13 which in this instance acts a compensating resistance, over the wire 41, through the dash light 42, tail light 3, to ground. The remaining portion of the circuit embraces the headlights 1, the wire 46 and the contact plate 28$^a$ to which a divided portion of the magneto current flows through the contact finger 25. The sixteen volt magneto current is consumed by the first resistance 13 which represents a 4-volt current drop, the light 42 or equivalent resistance which represents a 6-volt drop and the tail light 3 which represents a 6-volt drop thus making sixteen volts in all.

When the contact piece 22 is moved so that the key 21 points to the "dim" position, the magneto current traverses substantially the same circuit with the exception that the third resistance 15 is interposed in the wire 46 by reason of the engagement of the contact finger 25 with the contact plate 28$^b$. Formerly the resistance 15 was cut out. Upon turning the key 21 to the left extremity, the full battery current lights the tail light 3 and side lights 4.

This occurs when the engine is stopped and when the magneto consequently is not running. Current from the battery enters the contact piece through the wire 44, contact 27$^a$, contact finger 24, passes out of the finger 23, over the wire 43 to the tail light and to ground. The divided portion of the current traverses the contact finger 25, contact 28ᵈ, wire 47, stud 28ᶜ, wire 48, through side lights 4 and to ground. Upon moving the key 21 to the "dim" position the resistance 14 is interposed in the wire 44 consequently cutting down the current.

Obviously the one outstanding advantage of this electrical distribution system is, that the tail light is always lighted at night of course, whether the engine be running or not. As stated before, the tail light is usually lighted by an oil lamp. Oil lamps need frequent filling, the driver must get out to light them, and sometimes blow out. Attempts have been made to connect an electric lamp in the tail light in parallel with the headlighting circuit, but obviously when the engine stops the headlights go out and so does the tail light. Since the law requires the tail light to be lighted at night, the advantage of having an electrically lighted tail light under the conditions just named, becomes a disadvantage in that the law is evaded when the motor stops.

With the disadvantages just enumerated in mind, the great value of having means whereby the tail light may be constantly lighted by electricity, will be appreciated. It is unnecessary to again describe in detail how this is done, it being sufficient to repeat that the tail light together with the headlights are lighted from the magneto when the engine is running, and the tail light together with the side lights are lighted from the battery when the magneto is not running.

In conclusion, the function of the recess 10 in the insulating base 5, is to accommodate the split end of the stem 11 when the master switch is mounted upon a metal dash instead of the wooden dash shown. The metal dash is very much thinner and the difference in thickness or width between the dial 19 and the shell 7 is compensated for by pushing the stem 11 in so that the end of the stem enters the recess but the springy hold upon the contact piece 22 remains just the same.

There is one feature which the description of the tail light as being electrically illuminated, should not efface. The electric lamp in the tail light is in the nature of an auxiliary light, and the oil burning lamp is still retained in the tail light. Obviously the advantage of this arrangement is, that in periods of long waiting as for instance when the car is parked over night, the oil lamp is lighted since it is more economical to burn oil instead of electricity, particularly in view of the fact that in such an event current from the battery is used. The battery will probably consist of dry cells and the less current drawn from the cells will correspondingly prolong the life of the battery.

While the construction and arrangement of the electrical distributing system and especially that of the master controlling switch is that of a generally preferred form, obviously modifications and changes may be made without departing from the spirit of the invention or the scope of the claims. While the switch as shown, illustrates only one of a number of ways of carrying out the invention, other constructions may be devised to effect the same results. But as the switch construction is not covered in this application, it is of no great importance in this connection. One slight modification of the electrical distributing system, might consist of leaving out the dimming position on the battery side and adding a dimming position on the magneto side.

I claim:

1. In an electrical distributing system, the combination of the head, side and tail lights, a source of alternating electrical current for operating the head and tail lights together, a separate source of electrical current for operating the side and tail lights together, and a master switch for controlling the distribution of the electrical current from either source to the corresponding sets of lights.

2. In an electrical distributing system, the combination of the head, side and tail lights, electrical circuit connections embracing all of said lights, a source of alternating electrical current including an engine driven magneto for supplying the head and tail lights together, a separate source of electrical current for supplying the side and tail lights together, a master switch receiving said circuit connections and arranged to alternately light the head and tail lights and the side and tail lights in unison, each from the separate sources of current, and resistances interposed in said master switch adapted to dim the headlight of the first set of lights, on the alternating current, and dim all of the lights of the second set on the battery current.

3. In an electrical distributing system, the combination of two sets of lights comprising the head and tail lights and the side and tail lights of an automobile, a source of current for the head and tail lights including an engine driven magneto, a separate source of current for the side and tail lights including a battery, and a master switch including a reversibly shiftable member and a plurality of contacts controlled thereby, for alternately distributing current to the two sets of lights, the tail light being kept constantly burning from either source.

4. In an electrical distributing system, the combination of two sets of lights comprising the head and tail lights and the side and tail lights of an automobile, a source of current for the head and tail lights including an engine driven magneto, a separate source of current for the side and tail lights including a battery, a master switch including a reversibly shiftable member and a plurality of contacts controlled thereby, for alternately distributing current to the two sets of lights, the tail light being kept constantly burning from either source and resistance elements embodied in the master switch in association with certain of said contacts for dimming the lighted set of lights upon movement of the contact member with the associated contacts.

5. In an electrical distributing system, the combination of the head, side and tail lights of an automobile, a source of electrical current for the set of lights comprising the head and tail lights, a separate source of electrical current for the set comprising the side and tail lights, a master switch for controlling the distribution of the current from either source to the corresponding set said switch including, a plurality of contacts in circuit with certain of the sets, an insulating support for the contacts, a reversibly movable contact piece, means for turning said contact piece, and means including an indicator dial for showing the locations of said contacts.

JOHN HART WILSON.